United States Patent Office 2,886,582
Patented May 12, 1959

2,886,582
PROCESS FOR THE MODIFICATION OF ALKYL SILANES

Hans Wilhelm Kautsky and Gerhard Fritz, Marburg (Lahn), Germany

No Drawing. Application January 13, 1954
Serial No. 403,912

Claims priority, application Germany January 17, 1953

5 Claims. (Cl. 260—448.2)

The present invention relates to an improved process for producing modified alkyl silanes and more particularly to a process wherein the type and number of the alkyl groups present can be altered and wherein high molecular weight products with Si—Si bonds can be produced.

In the production of high molecular weight or highly polymeric organic silicon compounds, it has previously been customary to react Grignard reagents or sodium alkylenes with silicon halides. Also, the treatment of halogenated di-silanes with zinc alkyls, Grignard reagents and metallic sodium in some instances leads to compounds of the type named.

The methods mentioned, however, are difficult to carry out and can only be used technically within very narrow limits. Furthermore, it has never heretofore been possible to modify the organic groups bound to the silicon, for example, to break down high molecular weight alkyl groups to lower alkyl groups such as methyl groups or to increase the number of hydrogen groups carried by the silicon with a corresponding decrease in the alkyl groups. The possibility of such a modification of alkyl silanes would, however, be of considerable advantage for the production of silicones.

In accordance with the invention, it was found that alkyl silanes could be modified both with reference to their molecular weight as well as with reference to the type and quantity of alkyl groups by heating alkyl silanes at atmospheric pressure and, preferably, below atmospheric pressure to temperatures above their decomposition temperature and rapidly cooling the thermal decomposition products formed. The duration of such heat treatment to a certain extent, e.g. from about one minutes to one hour, determines the nature of the modified products obtained. The longer the duration of such heat treatment the higher will be the molecular weight of the reaction products. It is desirable to remove the modified products sought from the reaction zone as quickly as possible and quench them by rapid cooling. Preferably the alkyl silanes treated according to the invention are those containing at least one Si—H bond. The decomposition temperature of alkyl silanes containing Si—H bonds lies in the neighborhood of 450° C. The thermal decomposition of the alkyl silanes according to the process of the invention leads to the production of higher molecular weight organic silanes while at the same time a change in the organic radical carried by the silicon is effected and in some instances the number of hydrogen atoms is increased. For example, when compounds such as $C_2H_5SiH_3$, $(C_2H_5)_2SiH_2$, or $(C_2H_5)_3SiH$ are heated to temperatures between 440 to 460° C. or higher they decompose with the formation of higher molecular weight compounds such as $Si_2C_9H_{24}$ or other viscous organic silicon oils and solid products such as, for example, $(SiCH_3)_x$. On the other hand, varying quantities of lower molecular weight organic silicon compounds such as $CH_3SiH_3$, $(CH_3)_2SiH_2$ and $(C_2H_5)(CH_3)SiH_2$ are also formed. It is most surprising that the pyrogenic process leads to the formation of the Si—Si chains which are present in the higher molecular weight products. It is believed that these and other products are formed by the terminal radicals formed during the decomposition of the starting materials which lead to higher molecular weight materials upon ensuing disproportionation.

The properties of the products produced directly by the pyrogenic decomposition according to the invention are interesting. For example, the viscous oils produced when applied to surfaces will harden upon standing in air to form lacquer-like coatings which, for example, can be employed for protection against rusting. The application of sufficiently thick coatings to metal, glass or rubber also affords protection against attack by, for example, acids or organic solvents. Disproportionations can be effected by heating which lead to high molecular solid products which are insoluble in organic solvents. For example, products such as $Si_2C_9H_{24}$ which are quite soluble in pentane can be converted into a clear solid amber yellow product which no longer dissolves in pentane by heating for one or two hours at about 400° C.

The products produced by the process according to the invention can also be employed as adhesives, for example, to bond metal together or with other materials, or to cement glass, porcelain and the like. Furthermore, they have possibilities of use as lubricant oils, filling oils for high vacuum pumps, transformer oils, circuit breaker oils and in instances where resistance to creeping currents is desired, such as, in accumulators. They may also be employed for coating molds, as protective or impregnating agents for wood, as insulating materials in the electrical industries, as starting materials for hardenable resins and the like. In many instances the products can be dyed. Furthermore, some of the products are plastic or elastic. All of the products have the common property that they are water repellent.

The following examples will serve to illustrate several modifications of the invention.

*Example 1*

Vaporized diethyl silane was passed at a pressure of about 100 mm. Hg through an evacuated reaction vessel heated to 450° C. During the passage of the vapor through the reaction vessel a decomposition occurred with the formation of the following products: $C_2H_4$ $$SiH_4 + C_2H_4$$

$CH_3SiH_3$-propane, $Si_2C_9H_{24}$ (boiling point 145° C. at 590 mm. Hg), viscous yellow oils with a silicon content of 50–60% in which the silicon atoms are connected to each other with Si—Si bonds and the remaining valences of the silicon are satisfied with organic radicals, and a yellow solid product of the composition $(SiCH_3)_x$. Analysis of this compound shows that each Si-atom is directly bound to other three Si-atoms by Si—Si bonds. The remaining free valences of the Si-atoms are satisfied by a $CH_3$-radical.

*Example 2*

Vaporized $C_2H_5SiH_3$ was passed at a pressure of 200 mm. Hg through a reaction vessel heated to 450° C. The reaction products formed corresponded to those indicated in Example 1.

*Example 3*

Vaporized $(C_2H_5)_3SiH$ was passed at a pressure of 100–300 mm. Hg through a reaction vessel at 480° C. The reaction products contained a number of organic silicon compounds which essentially corresponded to those of Example 1.

Example 4

$C_2H_5SiH_3$ in admixture with ethylene was heated in a closed system of 450° C. The pressures of the ethylene and $C_2H_5SiH_3$ respectively were 109 and 139 mm. Hg. When further heating to the decomposition-temperature of $C_2H_5SiH_3$, e.g. at 455° C., this decomposition causes the reaction with ethylene with a reduction in pressure. The reaction time is about 40 minutes. The products of the reaction were lower and higher molecular weight organic silicon compounds, such as $CH_3SiH_3$ $$(C_2H_5)_2SiH_2$$

and higher molecular weight products with a high silicon content.

We claim:

1. A process for modifying a halogen-free alkyl silane containing at least one Si—H bond to produce a higher molecular weight liquid organic silane containing an Si—Si bond which consists in thermally decomposing an ethyl silane within a reaction zone maintained at a pressure of atmospheric and below atmospheric, effecting said decomposition over a 1 to 40 minute time period and a temperature ranging from 400–480° C., quickly cooling the resulting reaction products and recovering therefrom said higher molecular weight liquid compound.

2. A process for thermally decomposing a halogen-free alkyl silane containing at least one Si—H bond to obtain therefrom a higher molecular weight liquid organic silane containing an Si—Si bond, which consists in heating an ethyl silane at substantially atmospheric pressure to a temperature between about 400° C. and 480° C. within a reaction zone over a 1 to 40 minute time period to effect decomposition thereof, cooling the resulting reaction products quickly and recovering therefrom the desired higher molecular weight silane liquid product.

3. A process for thermally decomposing a halogen-free alkyl silane containing at least one Si—H bond to convert said silane to a liquid higher molecular weight compound containing an Si—Si bond which consists in heating an ethyl silane at atmospheric pressure within a reaction zone to a temperature between about 440° C. and 460° C. for a period of time ranging from about 1 minute to 40 minutes, quickly cooling the resulting reaction products and recovering therefrom said higher molecular weight liquid product.

4. A process for thermally decomposing a halogen-free alkyl silane containing at least one Si—H bond to convert said silane to a liquid higher molecular weight compound containing an Si—Si bond which consists in heating diethyl silane below atmospheric pressure within a reaction zone to a temperature between about 440° C. and 460° C. for a period of time ranging from about 1 minute to 40 minutes, quickly cooling the resulting reaction products and recovering therefrom said higher molecular weight liquid product.

5. A process for converting a halogen-free ethyl silane to a liquid higher molecular weight compound containing an Si—Si bond which consists in heating said ethyl silane within a reaction zone maintained below atmospheric pressure and at a temperature between about 440° C. and 460° C. for a period of about 1 minute to 40 minutes, quickly cooling the resulting reaction products and recovering therefrom the higher molecular weight liquid product formed in the process.

References Cited in the file of this patent

UNITED STATES PATENTS

| | | |
|---|---|---|
| 2,598,435 | Mohler | May 27, 1952 |
| 2,628,243 | Barry | Feb. 10, 1953 |

FOREIGN PATENTS

| | | |
|---|---|---|
| 961,878 | France | Nov. 28, 1949 |

OTHER REFERENCES

Stock et al.: "Berichte der Deutschen Chemischen Gesellschaft," vol. 52 (1919), p. 707.

Sachanen: "Conversion of Petroleum," 2nd ed. (1948), Reinhold Publ. Corp., New York, p. 290.

Fritz: "Zeitschrift fur Naturforschung," vol. 5B (1950), p. 444.

Fritz: "Zeitschrift fur Naturforschung," vol. 7B (1952), pp. 207–216.

Fritz: "Z. Anorg. U. Allgem. Chem.," vol. 273, August 1953, pp. 275–85.